(12) United States Patent
Harrison

(10) Patent No.: US 7,210,211 B2
(45) Date of Patent: *May 1, 2007

(54) THREE PLY BOLTED TEMPORARY ROAD MATS AND APPARATUS FOR MANUFACTURING SAME

(76) Inventor: Ronald Harrison, Carolina Mat, Inc. P.O. Box 339, Plymouth, NC (US) 27692

( * ) Notice: Subject to any disclaimer, the term of this patent is extended or adjusted under 35 U.S.C. 154(b) by 61 days.

This patent is subject to a terminal disclaimer.

(21) Appl. No.: 10/750,272

(22) Filed: Jan. 2, 2004

(65) Prior Publication Data

US 2005/0022363 A1   Feb. 3, 2005

Related U.S. Application Data

(63) Continuation-in-part of application No. 10/407,992, filed on Apr. 7, 2003, now Pat. No. 6,745,452.

(51) Int. Cl.
- B23B 39/18 (2006.01)
- B23B 39/16 (2006.01)
- B23G 1/20 (2006.01)
- B27C 3/04 (2006.01)

(52) U.S. Cl. .............. 29/525.02; 29/563; 29/564; 29/26 A; 29/281.5; 408/25; 408/46; 408/53

(58) Field of Classification Search ........... 29/525.02, 29/525.11, 464, 467, 563, 564, 26 A, 281.5, 29/281.1; 144/35.1; 269/910, 303, 296–299; 408/25, 43, 46, 48, 49, 51, 53

See application file for complete search history.

(56) References Cited

U.S. PATENT DOCUMENTS

| | | | | |
|---|---|---|---|---|
| 410,784 A | * | 9/1889 | Colville | 408/25 |
| 4,410,024 A | * | 10/1983 | Folse, Sr. | 144/353 |
| 4,462,712 A | * | 7/1984 | Penland, Sr. | 404/36 |
| 5,032,037 A | * | 7/1991 | Phillips et al. | 404/73 |
| 6,523,243 B2 | * | 2/2003 | Phillips et al. | 29/464 |
| 6,745,452 B1 | * | 6/2004 | Harrison | 29/525.02 |

* cited by examiner

*Primary Examiner*—David P. Bryant
*Assistant Examiner*—Christopher M. Koehler
(74) *Attorney, Agent, or Firm*—Mills Law Firm PLLC

(57) ABSTRACT

An apparatus for making temporary road mats characterized by multiple layers of mutually perpendicular elongated timbers having an array of vertical intersections aligned in lateral rows. The apparatus includes a gang drill that moves relative to a roughly assembled mat for sequentially drilling the lateral rows of intersections.

13 Claims, 11 Drawing Sheets

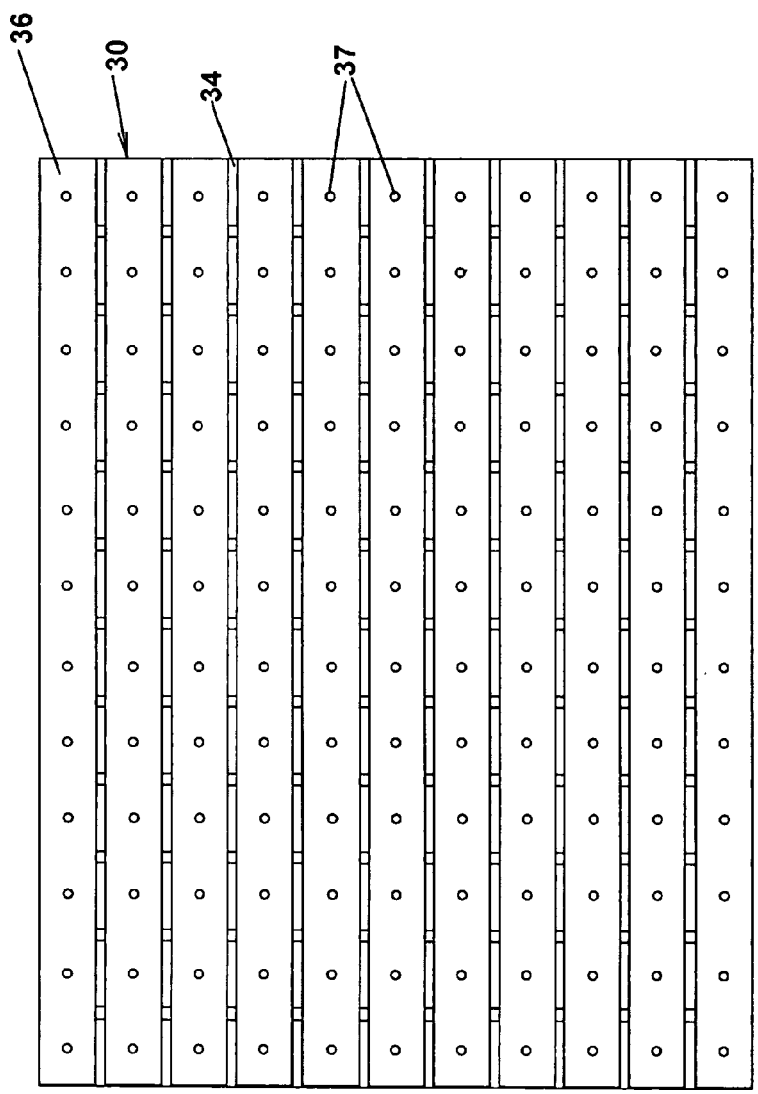
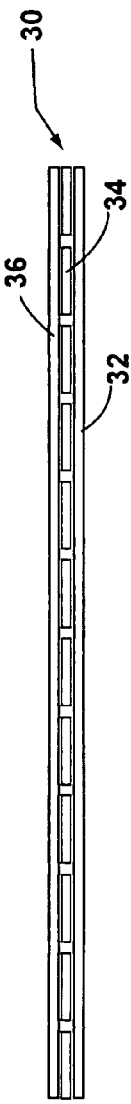
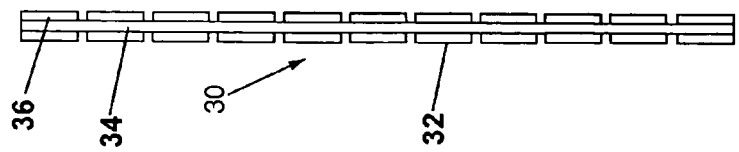
FIG. 9
FIG. 10
FIG. 8

THREE PLY BOLTED TEMPORARY ROAD MATS AND APPARATUS FOR MANUFACTURING SAME

RELATED APPLICATION

This application is a continuation-in-part application of U.S. Ser. No. 10/407,992 filed on Apr. 7, 2003 in the name of Ronald Harrison and entitled "Apparatus for Assembling Temporary Road Mats", which issued as U.S. Pat. No. 6,745,452.

FIELD OF THE INVENTION

The present invention relates to temporary road surfaces and, in particular, to apparatus for manufacturing and assembling three ply temporary road mats.

BACKGROUND OF THE INVENTION

Temporary road mats are used extensively to allow vehicles and equipment to reach locations not serviced by permanent roads, particularly under conditions where ground surface would not support the traffic or where the temporary nature of use does not warrant the time and expense of a permanent road. The mats are generally constructed in multiple layers of heavy wood timbers in criss-crossing layers. The mats may also be provided with inter-locking joints for connecting with adjacent mats as disclosed in U.S. Pat. No. 4,462,712 to Penland; U.S. Pat. No. 5,032,037 to Phillips et al.; and U.S. Pat. No. 4,889,444 to Pouyer. Commonly, each layer is nailed to the underlying layer. The final layer is fastened with an extended length nail having a protruding tip that crimped over to secure the assembly as disclosed in U.S. Pat. No. 5,234,204 to Hunt. The manual assembly, even with air powered nailing guns in time consuming and tiring and prone to misalignments. For heavy duty applications, three ply mats are employed. Initially, two layers are nailed as a subunit, with the third layer nailed thereto in a separate assembly sequence. This type of nailed construction provides limited torsional and bending strength, resulting loosening of the nailed joints and timber breakage. Replacing a damage timber requires time consuming removal of all overlying timbers. The entire length of timber must be replaced inasmuch as limited compression and shear strength precludes splicing with shorter lengths. Where the nail loosening occurs at the intermediate layer, supplemental nailing from both the top and bottom surfaces may be required to regain suitable strength at the joint. Such supplemental nailing can also splinter the timber resulting in a complete loss of nail holding strength.

Various assembly devices have been proposed for more accurately aligning the timber layers prior to nailing. U.S. Pat. No. 4,922,598 to Pouyer discloses an assembly table having an array of alignment stops for assisting positioning the timbers prior to nailing. U.S. Pat. No. 5,234,204 to Hunt, referenced above, discloses a dual stage assembly table facilitating nailing on opposite sides of the mat. Crimped extended length nails are used on the final layer to resist a lifting of the nail heads that can damage vehicle tires.

The nailing of the timbers also precludes convenient repair and replacement of damaged timbers. Typically, the mat must be substantially disassembled to access and replace damaged members. Bolted constructions have been suggested in the art, however, such mats are not known to be commercially available. Therein, holes are drilled at the intersections of the crossed timbers for receiving threaded fasteners. The resulting construction provides a smooth upper surface free of protruding nail heads. When replacement of a member is required, only the fasteners in the affected area need to be removed to allow substitution. Notwithstanding the advantages of the bolted construction, production rates, even with fixtures and assembly tables, have been limited by the cycle times of the serially required operations.

Moreover, three ply mats have not been successfully produced. The cumulative tolerances in the hole arrays for the three layers present's extreme alignment problems for assembly. Approaches increasing the clearances between the holes and bolt shanks result in a loss of lateral structural stability. Leveraging the boards to align the holes for assembly results in a stressed assembly condition that can result in timber fracture and surface warping.

Accordingly, a need continues to exist for three ply bolted temporary road mats that may be assembled accurately under low stress conditions.

BRIEF SUMMARY OF THE INVENTION

The present invention provides an improved method for making bolted three ply temporary road mats wherein fastener holes are drilled concurrently by a gang drill apparatus into the freely assembled mat, the apparatus and mat indexed to successive positions for drilling while the preceding rows are fastened by carriage bolts, continuing until the mat is fully assembled. Resultantly, the completed mats can use fastener holes having close sliding fits with the bolts providing increased bilateral stability. Moreover, the fasteners are connected with only compressive forces substantially reducing assembly stresses on the timbers.

In one aspect of the invention, a mat assembly line includes a pair of in-line, phase opposed multilevel assembly tables supplied with precut timbers from conveyor systems including a trimming station. The precut timbers are oriented into multiple layers of mutually perpendicular timbers atop the table. A mobile gang drill carrying a plurality of drill heads travels along rails at the sides the assembly tables and sequentially drills through holes at each lateral row of timber intersections. Carriage bolts are inserted downwardly through the drilled holes as completed. At lower bays beneath the assembly tables, nuts are assembled on the bolts to provide a unitized assembly. During the drilling at the first table, another mat is assembled at the other table. Following completion at the first table the gang drill indexes to the second table and performs the drilling sequence thereat, while the bolts are fastened at the first table. The gang drill alternates between the tables, with upper and lower crews transferring between tables for continuity and efficiency.

In another aspect of the invention, there is provided a mat assembly line wherein an indexing conveyor is supplied with precut timbers from conveyor systems including trimming stations. The precut timbers are oriented into multiple layers of mutually perpendicular timbers atop the table. The indexing conveyor shifts the timber stack to a stationary gang drill whereat a plurality of drill heads drills counter-bored holes for a single row. After drilling, the indexing conveyor shifts the timber stack to drill the next row of holes. Concurrently, the bolts are inserted and fastened at prior set. The sequences are repeated until the mat is fully drilled and assembled.

In one aspect of the invention there is provided an improved apparatus for making temporary road mats of bolted construction characterized by multiple layers of mutually perpendicular elongated timbers having an array of vertical intersections comprised of longitudinally spaced lateral rows, wherein said apparatus comprises: a pair of assembly tables spaced along an assembly line of a work floor, each of the tables having an upper layout surface spaced vertically above the work floor and providing a work bay therebelow, said layout surface having indicia for orienting the discrete timbers in each layer whereby said timber may be roughly assembled thereon into said layers with said intersections; a gang drill assembly supported for controlled movement in a longitudinal path along said assembly line with respect to said pair of assembly tables, said gang drill assembly carrying a plurality of drill units above said layout surface aligned for drilling the lateral rows of intersection; means for aligning said drill units at said lateral rows and for downwardly for moving said drill units to form through holes through said timbers at said intersections subsequent to which bolts are inserted in into said through holes from above said layout surface and fasteners are connected with said bolts in said work bay, the movement of said gang drill assembly and the sequence of said drilling being alternated between said assembly tables.

Accordingly, it is an object to provide an improved temporary road mat having threaded fasteners releasably interconnecting the various components.

Another object of the invention is to provide a three ply temporary road mat fastened by carriage bolts.

A further object is to provide an improved apparatus for assembling temporary road mats wherein rough timbers are feed on a conveyor system through a trimming station to provide precut timbers to a pair of spaced assembly tables for positioning into multiple crossed layer orientation and a longitudinally positionable multiple drill assembly alternately drills fastener holes in the timbers at each table.

Another object is to provide an apparatus for assembling bolted temporary road mats wherein a gang drill assembly is used to simultaneously drill lateral rows of through holes for receiving fasteners for interconnecting the mat components.

DESCRIPTION OF THE DRAWINGS

The above and other features and advantages of the invention will become apparent upon reading the following written description taken in conjunction with the accompanying drawings in which:

FIG. 8 is a side elevational view of the temporary road mat as shown in FIG. 7;

FIG. 9 is a top view of the temporary road mat as shown in FIG. 7;

FIG. 10 is a front view of the temporary road mat as shown in FIG. 7;

DETAILED DESCRIPTION OF THE PREFERRED EMBODIMENT

Figure 1:
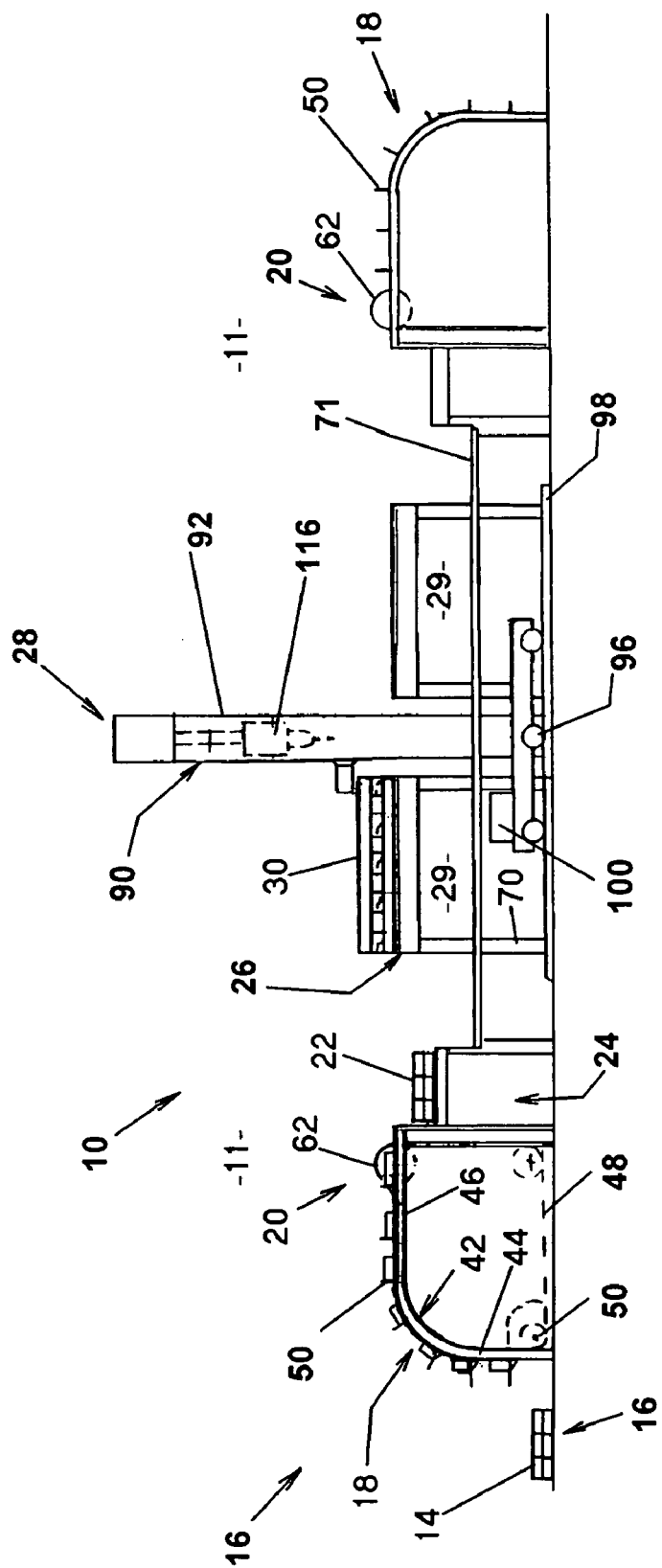
FIG. 1 is a side elevational view of an apparatus for the manufacture of temporary road mats in accordance with a preferred embodiment of the invention.

Referring to the drawings for the purpose of illustrating a preferred embodiment of the invention and not for limiting same, FIG. 1 shows an assembly apparatus 10 for the manufacture of temporary road mats. The apparatus 10 comprises a pair of in-line multilevel assembly lines 11. At the outer end of each line 11 rough wooden timbers 14 are delivered to a loading area 16, transferred by conveyor 18 through trimming station 20 to produce finished timbers 22 and unloaded at transfer area 24. The finished timbers 22 are assembled on assembly tables 26, drilled at vertical locations by a mobile gang drill 28, and fastened at underlying fastener bays 29. Fully assembled mats are removed from the assembly tables 26 by suitable material equipment such as overhead cranes or mobile fork lifts.

Referring to FIGS. 7 through 10, a completed temporary road mat 30, according to one embodiment, comprises three mutually perpendicular layers of spaced finished timbers. The width and length of the mat are generally in two foot increments and the mat is rectangular in shape, for instance 8 feet by 12 or 16 feet. Depending on load requirements, two layers may be sufficient and in severe environments, greater than three layers may be preferable. Moreover, the ends and sides may have staggered ends adapted for interlocking assembly. Further, the top lay may be configured for distinct vehicle tracks. For each of the above and the like, the layers must be securely interlocked to maintain structural integrity during use.

The mat 30 comprises a first or base layer 32 having longitudinally extending, laterally spaced members, a second or middle layer 34 having laterally extending, longitudinally spaced members, and a third or top layer 36 having longitudinally extending, uniformly laterally spaced members vertically overlying the first layer. The assembly thus forms distinct, mutually perpendicular layers of intersecting rows and columns in grid array of mutually overlying intersections. Through holes, as hereinafter described, are drilled through the overlapping members at such intersections. Suitable fastener systems 37, as described below, extend through the holes and bolted for mutually clamping the layers together. In the present invention a carriage bolt is inserted downwardly through each hole and a nut threaded thereto at the lower surface.

Figure 2:
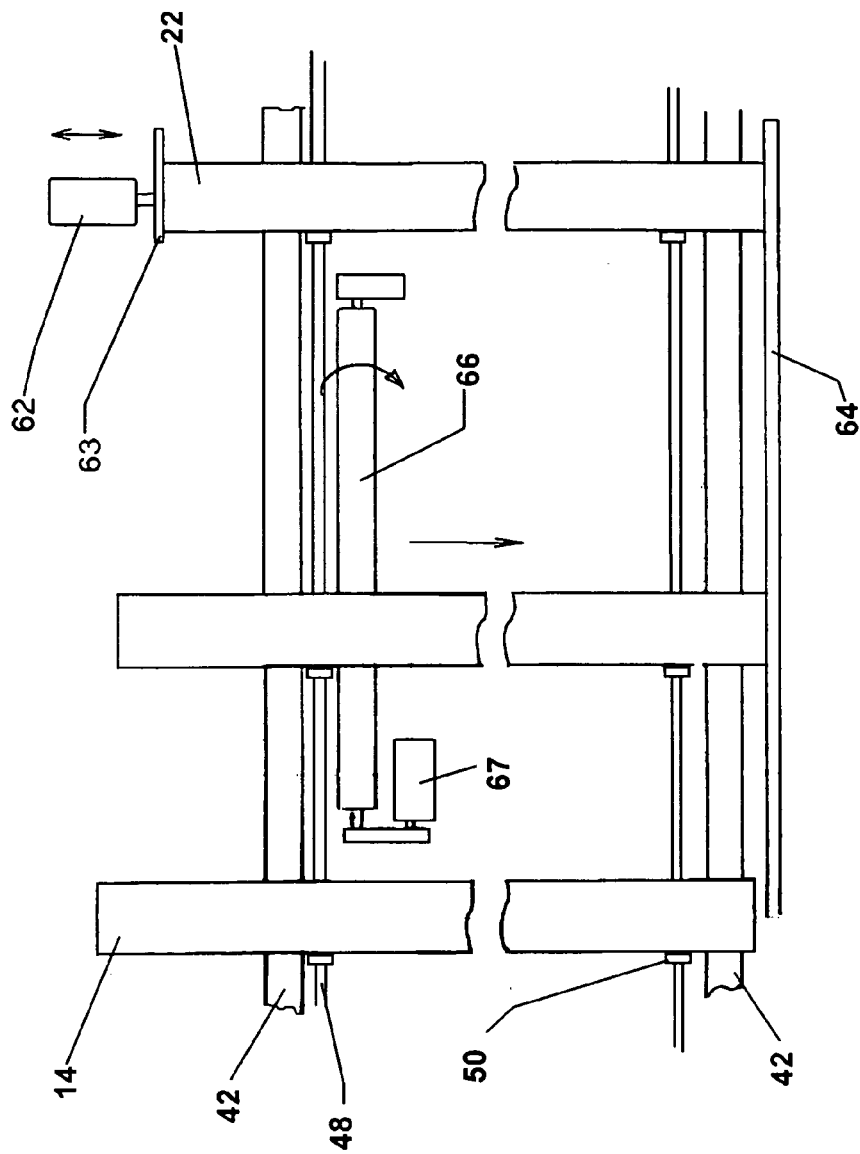
FIG. 2 is a top view of the conveyor and trimming station for the apparatus showing the trimming of rough timbers to length.

As shown in FIGS. 1 and 2, timbers roughly to length are delivered to a loading area in front of the conveyor 16. The conveyor 16 includes a support assembly 40 having a pair of laterally spaced guide rails 42. The guide rails 42 include upwardly curved, arcuate entry legs 44 merging with horizontal top legs 46. A drive chain 48 is guided on sprockets for guided movement adjacent the guide rails. A control motor 50 is operatively connected to the drive chain 48 for operating the chain under manual or automatic control. Each drive chain 48 carries a plurality of spaced transfer dogs 52 that project outwardly of the guide rails 42. The rough timbers 14 are sequentially loaded on the dogs 52 and transferred forwardly by the drive chain upwardly along the entry legs 44 and inwardly along the top legs 46.

The conveyor 16 extends through the trimming station 18 and delivers the cut timbers to the transfer area 26. The trimming station 18, as shown in FIG. 2 includes a laterally adjustable circular saw unit 62, a fence 64 and a transfer roll 66. The transfer roll 66 is operatively connected to a drive unit 67 for rotation as shown by the arrows. The saw unit 62 is mounted for adjustable transverse movement as indicated by the arrows. As the rough timbers 14 are carried into the trimming station 18, the transfer roll 66 laterally shifts the timbers outwardly against the fence 64. The circular saw unit 62 is positioned downstream beyond the transfer roll 66 and laterally positioned to make a cross cut on the timbers representing a selected length between the saw blade and the fence, corresponding to the lengths in the desired mat layer. The range of adjustment between the saw unit and the fence is sufficient to handle sizing of the various timbers for the manufactured mat designs.

After trimming to length, the timbers for a layer are housed at staging area 24 prior to layout on the assembly tables. The assembly tables 26 are carried on support frames 70 elevated above the work floor at a sufficient height to establish a work bay 29 therebelow to enable workers to bolt the mats together as described below. The elevation of the tables 26 is slightly above the transfer area for providing ease of manual alignment of the members on the assembly tables. The tables 26 are surrounded and mutually spaced by elevated walkways 71 for permitting movement of the workers thereabout. Depending on production rates, a single crew on the upper level may alternate between the tables, and bolting crews alternate between the bays. Alternatively, a single crew may sequentially handle upper and lower level operations.

Figure 3:
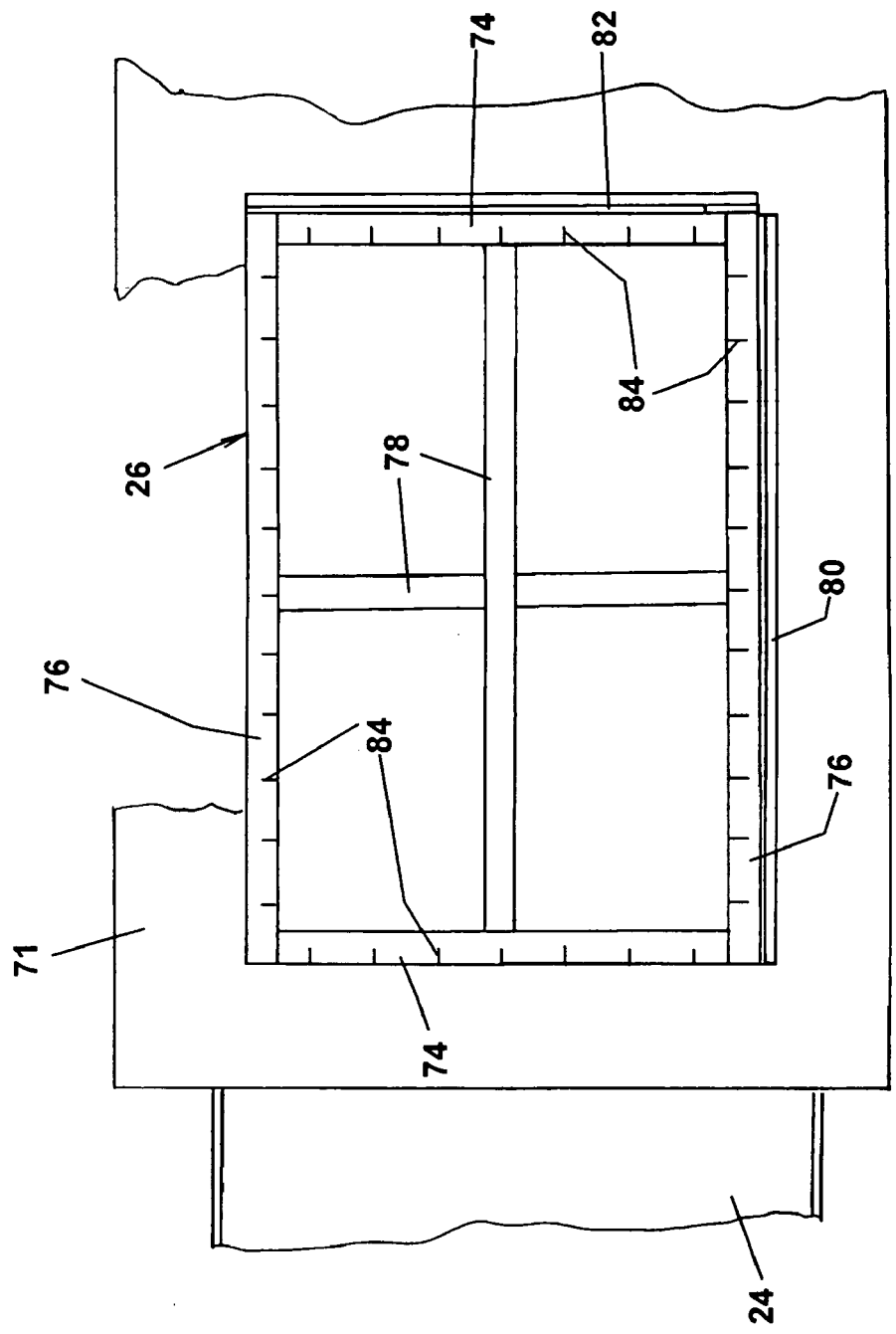
FIG. 3 is a top view of an assembly table and surrounding walkway for the apparatus.
Figure 4:
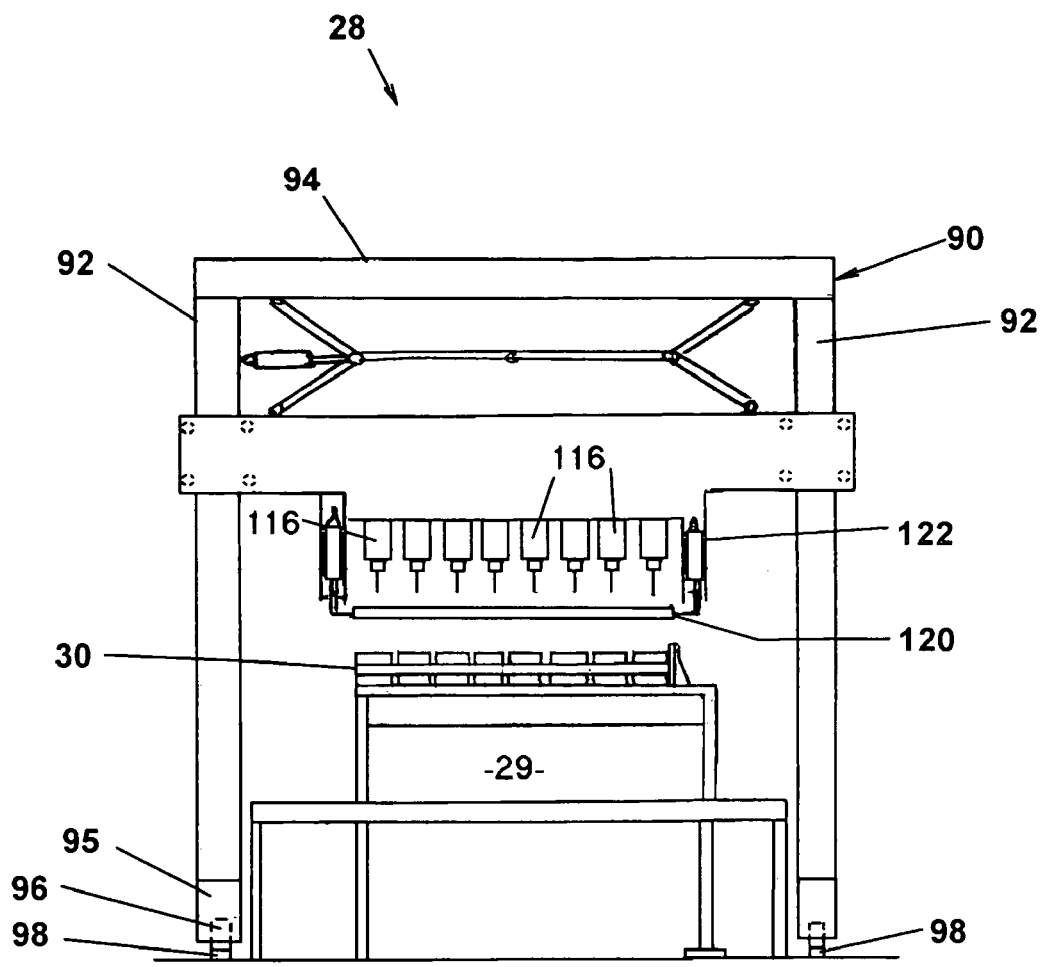
FIG. 4 is a front elevational view of the assembly table and mobile gang drill.

Referring to FIG. 3, the assembly tables 26 are provided a top frame including peripheral end supports 74 and side supports 76 interconnected with interior supporting members 78. A lateral fence 80 is aligned and attached at one side support 76, and a longitudinal fence 82 is aligned and attached at the inner end support 74 thereby providing an alignment surface for accurately positioning the ends of the timbers of the respective layers. Additional pivotal fences and clamps may be provided at opposed ends of the respective fences to mechanically position the timbers against the prime fences 80, 82. Additionally, the lateral and longitudinal sides are provided with spaced indicia 84 and/or affirmative locators for accurately referencing and establishing respective timber placement.

For assembling the bottom layer, the timbers 22 are removed from the transfer area 24, positioned against the end fence 82, and aligned with the indicia 84 to provide a longitudinal array of laterally spaced timbers for the bottom layer. Concurrently therewith, the trimming station 18 may be adjusted to trim the next set of timbers traversing the conveyor 16 to the determined length and in the required number for the middle layer. Alternatively, the middle layer timbers may be sized at a separate location and transferred to the assembly table for positioning atop the bottom layer.

After location of the bottom layer, the ends of the middle layer timbers are positioned against the lateral fence 80 and aligned with the indicia 84 to provide an aligned lateral array perpendicular to the bottom layer. Thereafter the upper set of timbers is trimmed and aligned mutually perpendicular to the middle layer, as described above, ready for drilling with the mobile gang drill 28.

The mobile gang drill 28 comprises a shuttle 90 having side support legs 92 laterally on either side of the line 10 and interconnected by a cross member 94. The legs include a horizontal base 93 carrying rollers 96 that are supported on longitudinal guide rails 98 spaced on the lateral sides of the assembly tables 11. A drive motor 100 is operatively connected with the rollers 96 is operable manually or automatically to move the gang drill 28 to controlled positions along the guide rails. A tool bar 110 is supported by a parallel linkage 112 at the cross member 94 and moved vertically by actuating cylinder 114 between raised and lowered positions. A plurality of drills 116 including drill bits 118 are carried on the tool bar 110 and adjustable laterally to register with the overlapping intersections of mat timbers for the design being manufactured. A press plate 120 is slidably supported at the legs 92 for vertical movement under the manual or automatic control of actuators 122. The press plate 120 is lowered to compressively clamp the timber layers adjacent the drills to prevent any misalignment of the timbers during the drilling.

Figure 5:
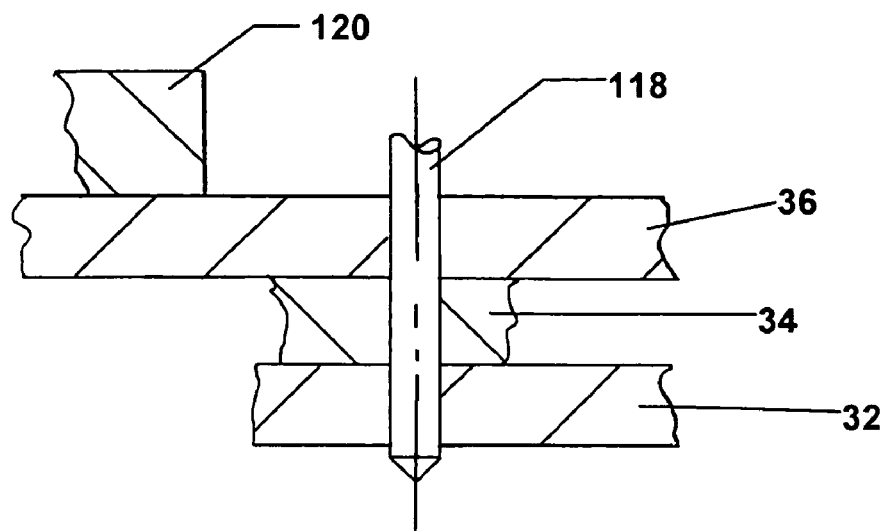
FIG. 5 is a cross sectional view illustrating the drilling of the timbers.
Figure 6:
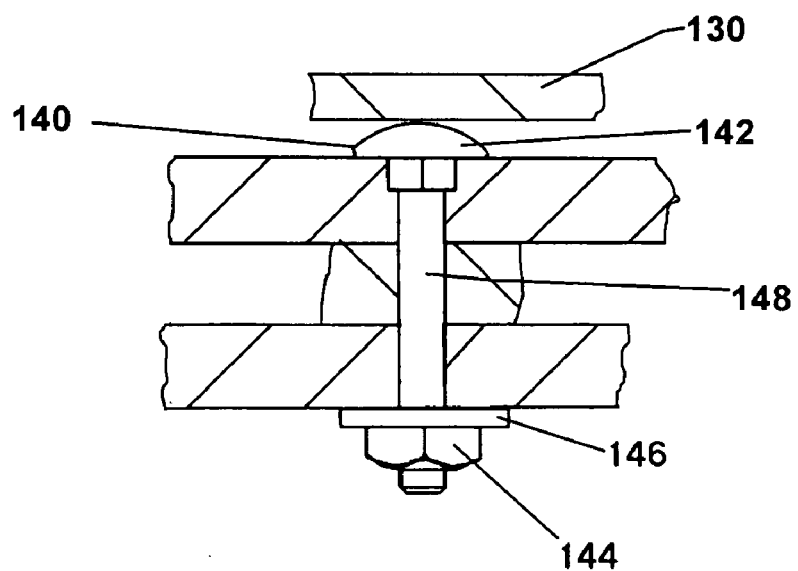
FIG. 6 is a cross sectional view of the timbers and carriage bolt fasteners.
Figure 7:
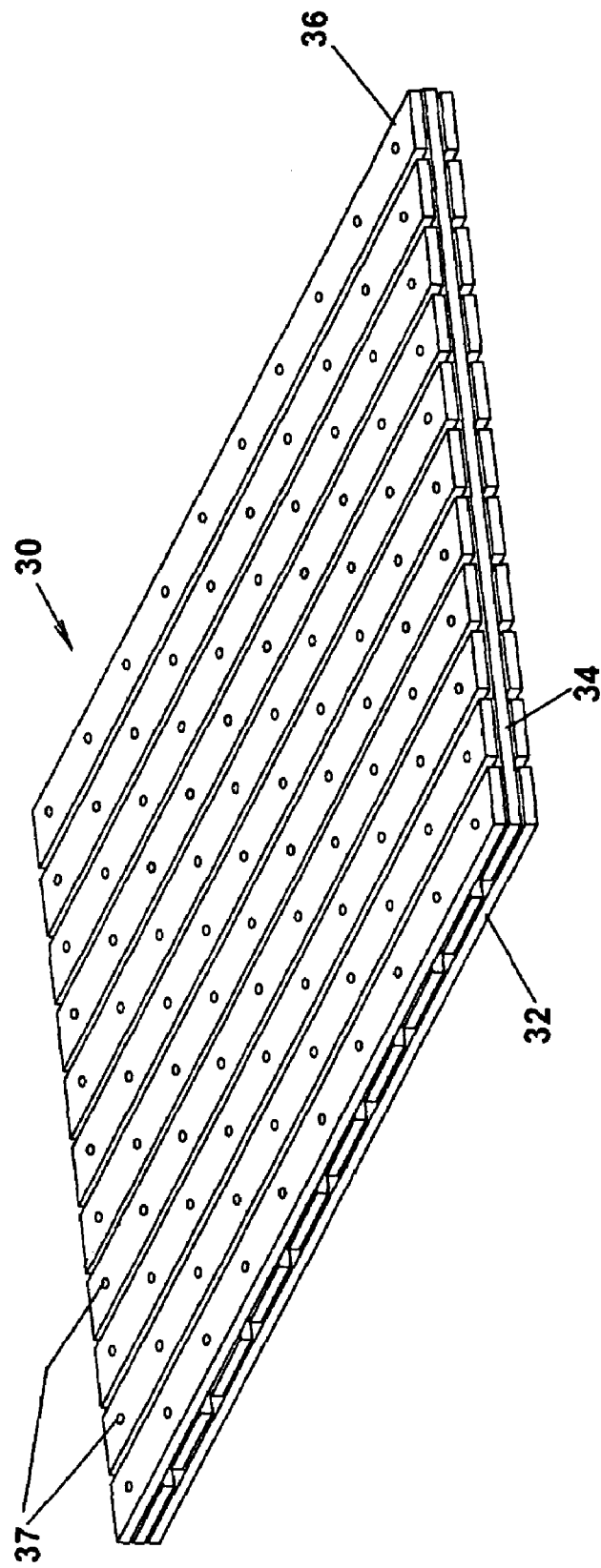
FIG. 7 is a perspective view of the temporary road mat in accordance with one embodiment of manufacture.

For the drilling sequence, the gang drill is indexed, manually or automatically, to position the drills over the outermost lateral row of timber intersections. Thereafter as shown in FIG. 5, the drills are energized and the actuator 122 extended to lower the press plate 120 to clamp the timbers. The actuator cylinders 114 are extended to lower the tool bar 110 thereby simultaneously drilling a lateral series of vertical holes completely through the three layers timbers. The drills 116 are withdrawn by the actuator cylinder 114, the press plate 120 raised by actuator 122, and the gang drill 28 moved to the next lateral set of intersections for repeating the foregoing drilling sequence. The drilling continues until all holes have been drilled. Thereafter, the drill assembly is parked intermediate the tables prior to undertaking the drilling sequences at the other table.

Referring to FIG. 5, following the drilling on the first row, the carriage bolts 140 are manually inserted into the drilled holes as available and until completed. After insertion of all the carriage bolts, a cover plate 130 is lowered onto the table over the bolt heads 142 to maintain position thereof during fastening. A work crew in the assembly bay 29 then fastens the nuts 144 and washers 146 to the threaded shank 148 of the bolts 140 using powered socket wrenches to unitize the assembly. Following completion, the cover plate is removed and the finished mat transferred from the table by suitable material handling equipment such as a forklift or mobile crane.

The apparatus above described allows work crews to continuously operate on both table. During the drilling sequence at one table, the mats are rough assembled on the other table. During the fastening at the first table, drilling is done at the other table. During assembly at the first table, the fastening is performed at the other table. In this manner, both tables are continuously used with the workload shifting between the levels. Moreover, the work crews may alternate between the tables at both levels or between levels at one table thereby efficiently utilizing both labor and machine component. It will thus be appreciated that the two bays working in tandem are able to balance machine and manual time content to utilize the equipment and labor in a productive efficient manner. Compared to serial drilling and fastening wherein about 2 mats per hour could be produced, the inline dual table of the present invention outputs completed mats at the rate of about 10 per hour with comparable labor content per mat.

It will be appreciated that the foregoing apparatus may be employed for the manufacture of differing sizes, layout and number of intersecting timber layers. Interlocking and/or staggered mat designs may be accommodated by table and drill layout. Further, dedicated wheel track patterns of current design may also be produced.

Figure 11:
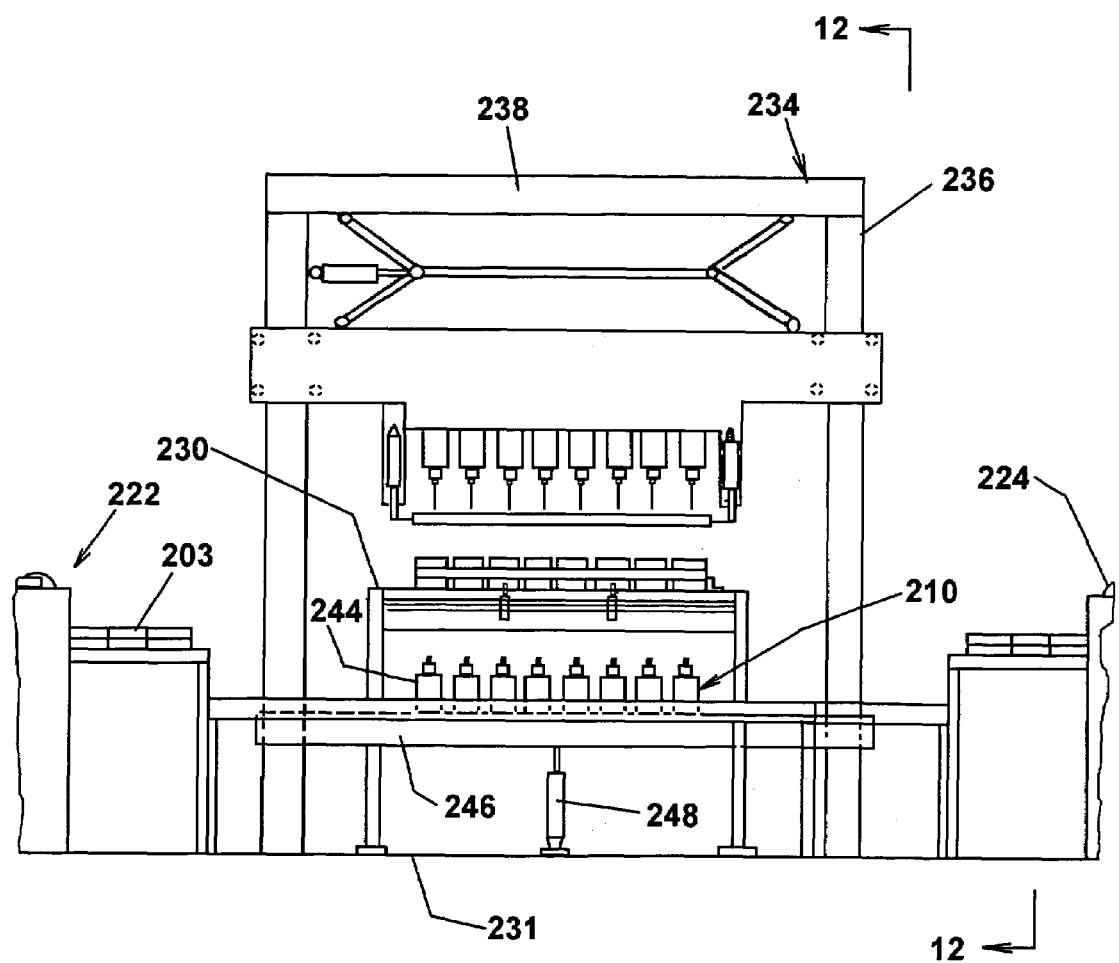
FIG. 11 is a front view of an apparatus for the manufacture of temporary road mats in accordance with another embodiment of the invention.
Figure 12:
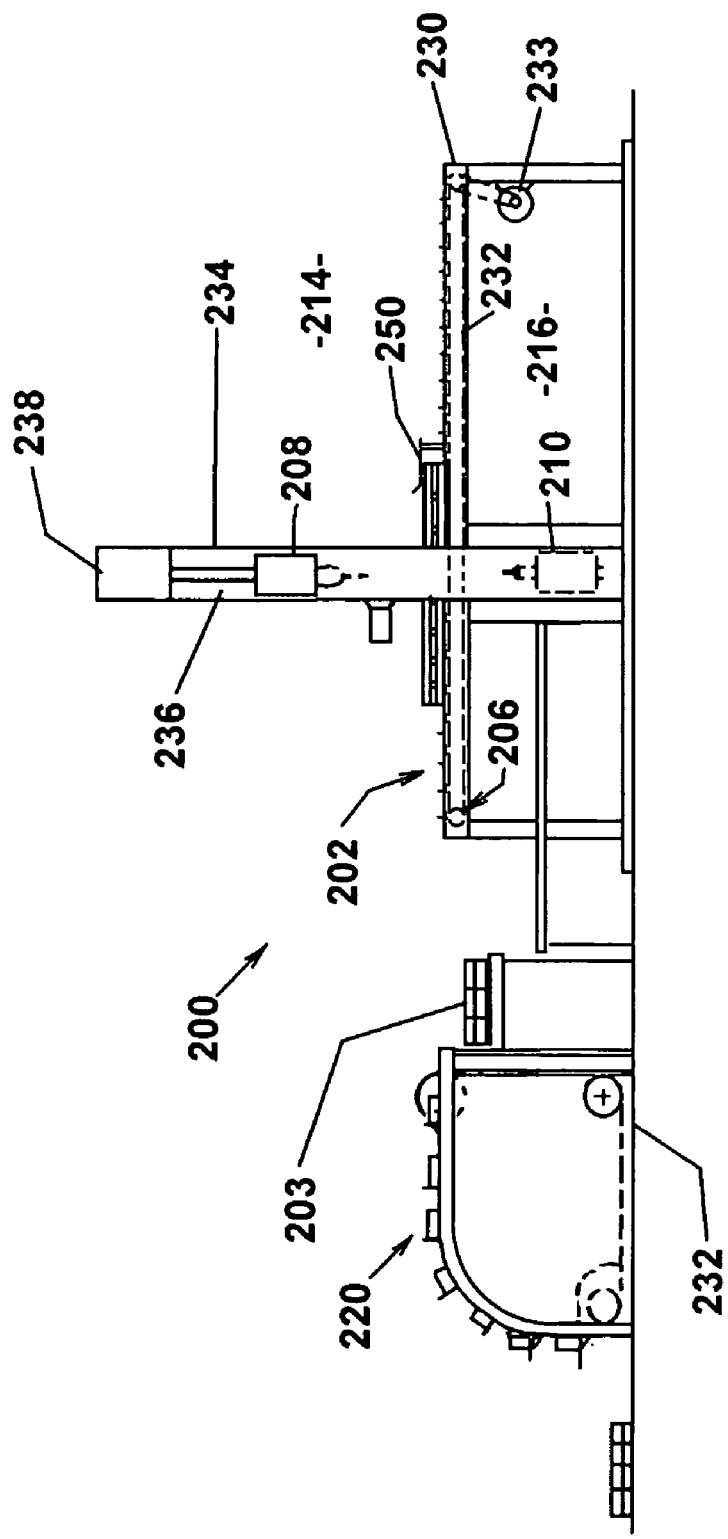
FIG. 12 is a side elevational view of the apparatus illustrated in FIG. 11 taken along line 12—12 in FIG. 11.
Figure 13:
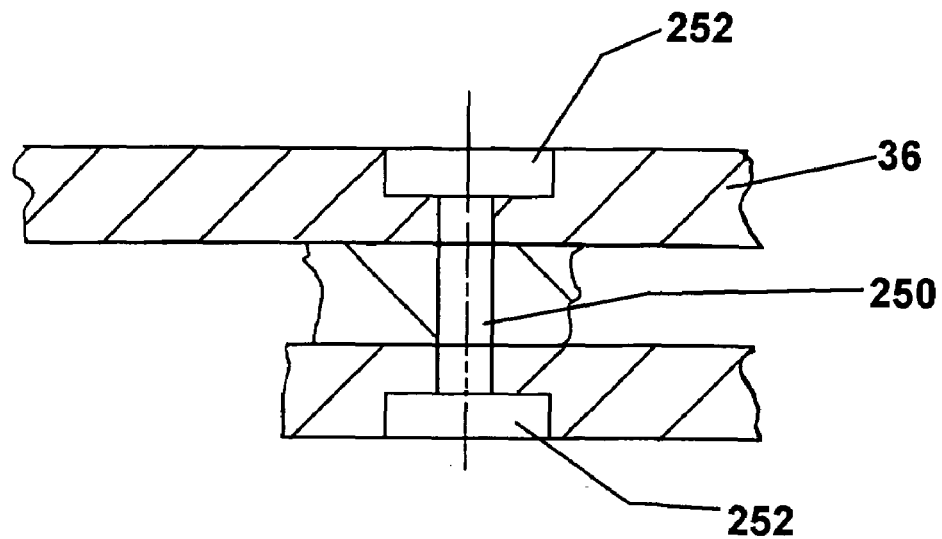
FIG. 13 is a fragmentary cross sectional view of the countersunk holes of the temporary road mat in the apparatus of FIG. 11.

Referring to FIGS. 11 and 12, there is shown another embodiment of the invention wherein the assembly apparatus is provided with stationary drilling assemblies and a mobile assembly platform. More particularly, the assembly apparatus 200 comprises a longitudinal assembly line 202 for routing timbers 203 in layers onto a mobile assembly platform including an indexing conveyor 206, past upper and lower drill assemblies 208, 210 respectively, for sequentially drilling a lateral series of holes in a roughly assembled mat 212, followed by bolting of the layers of timbers into compressive engagement to form a finished mat in upper assembly area 214 and lower assembly area 216.

The timbers 203 are transferred to the assembly platform by conveyor and trimming stations including end station 220, and side stations 222, and 224. The stations 220, 222, and 224 may be the same as the conveyor 18 and trimming station 20 described with reference to the first embodiment. The timbers may be inventoried at storage areas at the ends thereof or manually transferred as available to the assembly table.

The apparatus 200 includes an elevated platform 230 mounted on a base 231, such as a plant floor. The platform 230 extends along the assembly line 202 and supports the indexing conveyor 206. The drill assemblies 208, 210 are carried by a support frame 234 at about the center of the platform 230. The support frame 234 includes a pair of laterally spaced legs 236 attached to the base 231 and interconnected by cross arm 238.

The apparatus 200 provides the capability of assembling extended length platforms and accordingly the lateral timbers comprise the top and bottom layers 32, 36 and feed from the side stations 222, 224, with the longitudinal timbers comprising the middle layer 34 and supplied from the end station 220.

The indexing conveyor 206 includes a pair of laterally spaced motor driven drive chains 240 driven by motor 241 and extending longitudinally along the frame 234. The drive chains 240 include projecting lugs 242 engagable with the base layer timbers. By appropriate automatic or manual control, the conveyor 206 is intermittently operated to index successive lateral timbers at the drilling assemblies whereat the vertical fastener profile is formed.

The upper gang drill assembly 208 is supported on the frame and is substantially the same as the drill assembly in the first embodiment and reference may be made thereto for details thereof. The lower gang drill assembly 210 comprises a laterally spaced series of drills 244 supported on a cross bar 246 carried on the legs 236 of the frame 234 for movement by a hydraulic actuator 248 between the illustrated normal lowered position to a raised drilling position.

Figure 14:
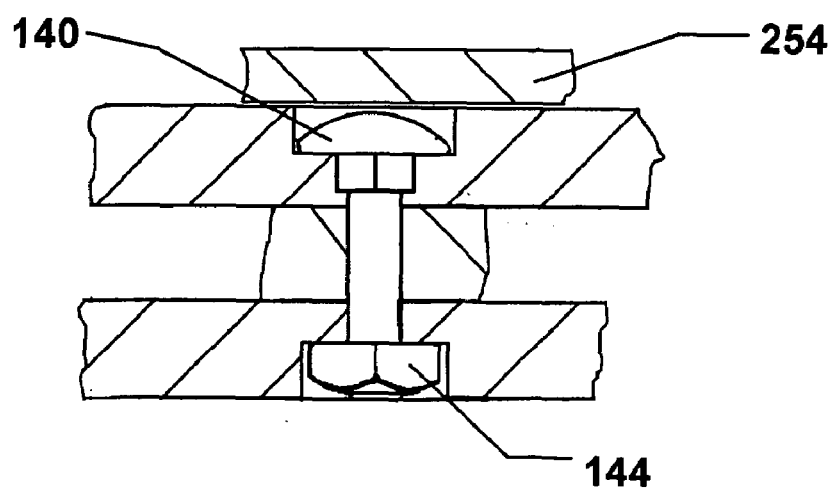
FIG. 14 is a fragmentary cross sectional view of the assembled carriage bolt maintained in the countersunk holes by the pressure plate prior to assembly.

To provide for recessing on the fastener to avoid surface projections on the top and bottom surfaces of the mat, as shown in FIG. 14, the drilled fastener profile includes a through hole 250, an upper counterbore 252 for the head of the bolt, and a lower counterbore 254 for the nut of the fastener.

The profile is formed by a drill bit on the upper drills comprising a main drill bit for forming the through hole 250 and a counterbore bit for forming the upper counterbore 252, and a drill bit on the lower drills 246 comprising a pilot drill and a counterbore bit for forming the lower counterbore 252.

In operation, with a lateral row of timber intersections indexed at the drill assemblies, the actuator 248 is extended to raise the lower drill assembly 210 for drilling the lower counterbores. Thereafter the upper drill assembly 206 is lowered for drilling the through hole and upper counterbores. The sequence is repeated for the remaining lateral rolls of the mat.

After the first row of profiles is formed and the mat indexed, the carriage bolts are inserted. This provides for low stress assembly inasmuch as the holes are coaxial at drilling and the short transfer area presenting little opportunity for timber shifting. After assembly of the first row, the alignment becomes increasingly stable thereby allowing the close sliding fit between the fastener and holes. To prevent the upward movement of the carriage bolts during attachment of the nuts, a slightly downwardly inclined plate 254 is supported above the table and timbers, downstream of the bolt assembly area. In the lower bay 260 below the table, the nuts are assembled on the bolts to create the composite mat. Upon completion, the composite mat is transferred from the line by appropriate material handling equipment. Depending on the front length of the indexing conveyor, initial assembly may commence on another mat while the preceding mat is finishing drilling and assembly.

Figure 15:
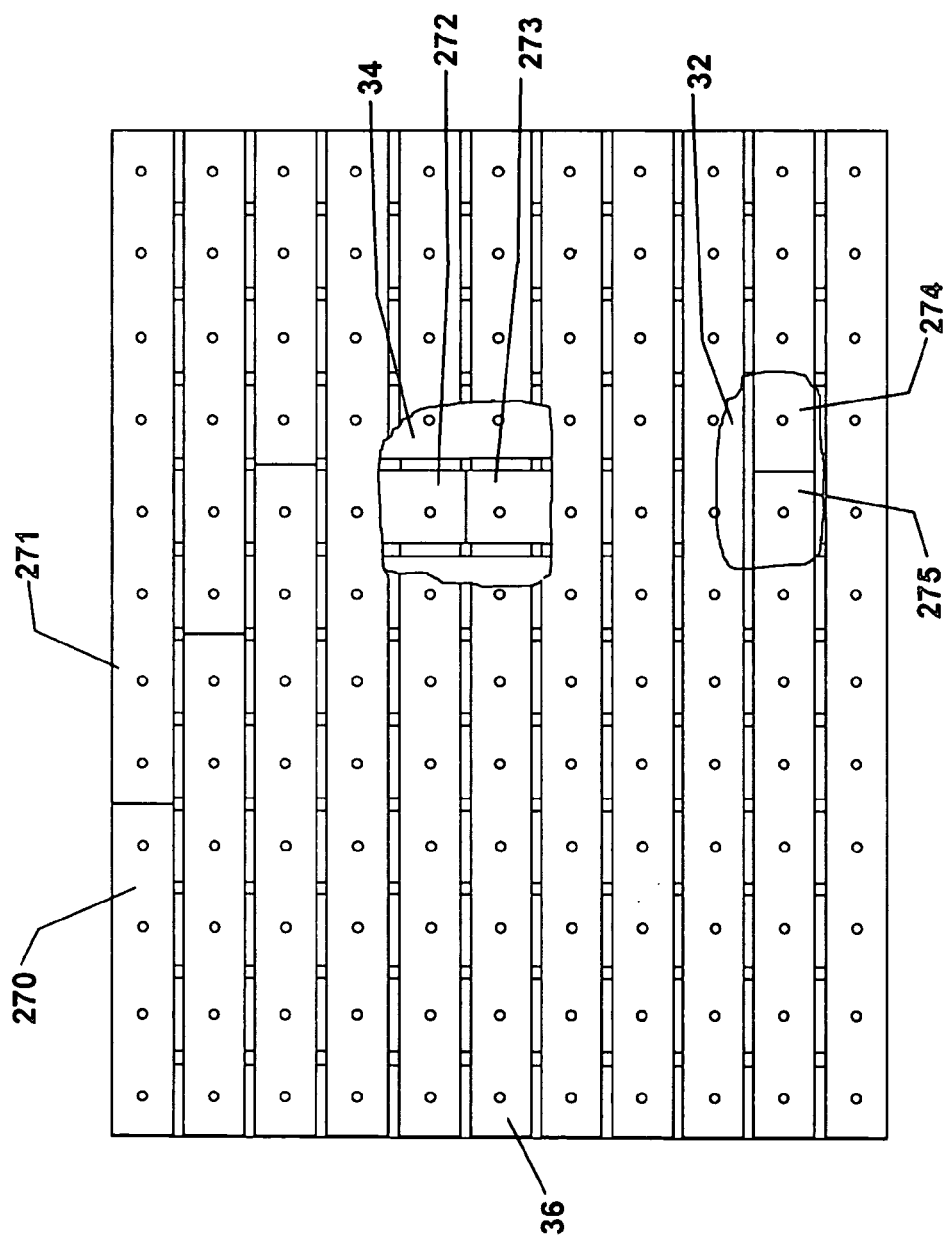
FIG. 15 is a top view of an embodiment of the temporary road mat illustrating the splicing of the timbers.

The three layer composite mats possess substantially improved bending and torsional strength in comparison with conventional nailed mat constructions. Such strength enables assembly used sliced timbers. As shown in FIG. 15, the top layer may comprise columns having spliced timbers 270, 271 thereby permitted the use of easier to obtain and cost effective timber lengths. The spliced construction may be used for all or a portion thereof. In such a spliced construction, it is desireable to stagger the spliced joints. Similar techniques may be used for the middle row 34 using spliced timbers 272, 273, and bottom layer 32 using spliced timbers 274.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

The invention claimed is:

1. An apparatus for making temporary road mats comprising of at least an upper layer and a lower layer, one of said layers including laterally spaced, longitudinally extending timbers, another of said layers including longitudinally spaced laterally extending timbers, said timbers overlying at an array of vertical intersections comprised of longitudinally spaced lateral rows, said apparatus comprising: a frame member; an assembly support on which said timbers may be roughly assembled thereon into said layers with said intersections; a gang drill assembly supported on said frame member, said gang drill assembly carrying a plurality of drill units above said layers for drilling said lateral rows of intersections; means operatively associated with said frame member and said drill units for selectively aligning said drill units with said lateral rows and for downwardly moving said drill units to serially form aligned holes through said timbers at said intersections subsequent to which bolts are inserted into said holes above said timbers and fasteners are connected with said bolts below said timbers resulting in a bolted assembled mat.

2. The apparatus as recited in claim 1 wherein said gang drill assembly is selectively longitudinally moveable with respect to said frame member.

3. The apparatus as recited in claim 1 wherein said gang drill assembly is stationary and said assembly support is longitudinally moveable with respect to said drill units.

4. The apparatus as recited in claim 3 wherein said assembly support comprises conveyor means for longitudinally moving said timbers to successively align said lateral rows of intersections with said drill units for drilling said through holes.

5. The apparatus as recited in claim 4 including an end conveyor and trimming station at one end of said assembly support for cutting rough timber to length for longitudinally extending timbers and for presenting the same for assembly.

6. The apparatus as recited in claim 5 including a first side conveyor and trimming station at one side of said assembly support for cutting rough timber to length for said laterally extending timbers and for presenting the same for assembly.

7. The apparatus as recited in claim 6 wherein said mat includes a top and bottom layer of laterally extending timbers, said first side conveyor and trimming station cutting said rough timber to length for said bottom layer, and a second side conveyor and trimming station on the other side of said assembly support for cutting rough timber to length for said laterally extending timber of said top layer and for presenting the same for assembly.

8. The apparatus as recited in claim 1 wherein said drill units include a first bit section for forming said through holes and a second bit section for forming counterbores in said upper layer of timbers.

9. The apparatus as recited in claim 8 including second drill units for forming counterbores in said lower layer of timbers.

10. The apparatus as recited in claim 1 including plate means overlying said lateral rows of drilled holes after insertion of said bolts through said through holes to maintain the positions thereof during said fastening.

11. A method of assembling temporary road surfaces having a least three mutually perpendicular layers of elongated members consisting of an upper layer, a middle layer and a bottom layer, the upper layer and lower layer consisting of timbers vertically aligned in one direction and the middle layer consisting of timbers aligned transverse to said upper layer and said middle layer whereby the layers overlap at lateral rows of vertical intersections, said method comprising the steps of: providing an assembly platform aligned in relation to a longitudinal path; orienting said bottom layer on said platform; transversely orienting said middle layer on said bottom layer; orienting said top layer on said middle layer parallel to said bottom layer thereby establishing a roughly assembled mat wherein the layers vertically overlap at lateral rows and longitudinal columns of intersections; providing a drill assembly including a plurality of drilling units aligned for concurrently drilling through holes in unison through intersections in a said lateral rows; serially indexing the roughly assembled mat with respect to said drilling units; drilling said through holes through each row of intersection until all required holes in said mat are completed; and inserting bolts through each row of drilled holes following the drilling thereof; and fastening nuts to the inserted bolts thereby compressively clamping the layers together at said intersections.

12. The method as recited in claim 11 wherein said serially indexing is provided by moving the drilling units with respect to said roughly assembled mat.

13. The method as recited in claim 12 wherein said serially indexing is provided by moving the roughly assembled mat with respect to fixedly longitudinally located drilling units.

\* \* \* \* \*